United States Patent
Machover et al.

(10) Patent No.: US 12,270,758 B2
(45) Date of Patent: Apr. 8, 2025

(54) AUTOMATED DETECTION AND QUANTIFICATION OF GAS EMISSIONS

(71) Applicant: Kayrros, Paris (FR)

(72) Inventors: Edouard Machover, Paris (FR); Gabriele Facciolo, Cachan (FR); Jean-Michel Morel, Paris (FR); Carlo De Franchis, Paris (FR); Thibaud Ehret, Champigny sur Marne (FR); Aurélien De Truchis, Paris (FR); Matthieu Mazzolini, Paris (FR); Thomas Lauvaux, Montpellier (FR)

(73) Assignee: Kayrros (FR)

( * ) Notice: Subject to any disclaimer, the term of this patent is extended or adjusted under 35 U.S.C. 154(b) by 252 days.

(21) Appl. No.: 17/970,337

(22) Filed: Oct. 20, 2022

(65) Prior Publication Data

US 2023/0111401 A1    Apr. 13, 2023

Related U.S. Application Data

(63) Continuation-in-part of application No. PCT/EP2021/069053, filed on Jul. 8, 2021.
(Continued)

(51) Int. Cl.
*G01N 21/3504* (2014.01)
*G06T 5/70* (2024.01)
(Continued)

(52) U.S. Cl.
CPC .......... *G01N 21/3504* (2013.01); *G06T 5/70* (2024.01); *G06T 5/77* (2024.01); *G06V 10/60* (2022.01);
(Continued)

(58) Field of Classification Search
CPC ............ G01N 21/3504; G01N 21/314; G01N 2021/1795; G01N 2021/3531; G01N 2201/0214; G01N 21/359; G06T 5/70; G06T 5/77; G06T 2207/10036; G06T 2207/10048; G06V 10/60; G06V 20/13
(Continued)

(56) References Cited

U.S. PATENT DOCUMENTS

2015/0323449 A1    11/2015    Jones et al.
2018/0039885 A1    2/2018    Albrecht et al.
(Continued)

FOREIGN PATENT DOCUMENTS

EP    1416258 A1    5/2004
WO    2017201194 A1    11/2017

OTHER PUBLICATIONS

Buades, A. et al., "A non-local algorithm for image denoising," IEEE computer society conference, Jun. 20, 2005, pp. 60-65, vol. 2.
(Continued)

*Primary Examiner* — Robert R Raevis
(74) *Attorney, Agent, or Firm* — Lerner David LLP

(57) ABSTRACT

A method for detecting and quantifying gas emissions from a satellite image comprises obtaining an image of an area of interest, determining an amount of variation in light intensity within the image, and correlating the amount of variation in light intensity within the image to a gas concentration of a gas emission located in the area of interest.

20 Claims, 9 Drawing Sheets

Related U.S. Application Data

(60) Provisional application No. 63/049,302, filed on Jul. 8, 2020.

(51) Int. Cl.
 *G06T 5/77* (2024.01)
 *G06V 10/60* (2022.01)
 *G06V 20/13* (2022.01)

(52) U.S. Cl.
 CPC .... *G06V 20/13* (2022.01); *G06T 2207/10036* (2013.01); *G06T 2207/10048* (2013.01)

(58) Field of Classification Search
 USPC ............... 73/1.02, 1.06, 23.2, 31.01, 31.02; 356/437; 250/339.13
 See application file for complete search history.

(56) References Cited

U.S. PATENT DOCUMENTS

| | | | |
|---|---|---|---|
| 2019/0003984 A1* | 1/2019 | Kester | G01J 5/0066 |
| 2021/0037197 A1* | 2/2021 | Kester | H04N 5/33 |
| 2023/0316691 A1* | 10/2023 | Giron | G06V 20/194 |
| | | | 382/103 |

OTHER PUBLICATIONS

Ehret, T. et al., "Automatic Methane Plume Quantification Using Sentinel-2 Time Series," IEEE, Jul. 17, 2022, pp. 1955-1958.

Ehret, T. et al., "Global Thracking and Quantification of Oil and Gas Methane Emissions from Recurrent Sentinel-2 Imagery," Physics ao-ph, Dec. 15, 2021, pp. 1-27.

Extended European Search Report including Written Opinion for Application No. 21305150 dated Jul. 19, 2021, pp. 1-5.

International Search Report including Written Opinion for Application No. PCT/EP2021/069053 mailed Sep. 27, 2021, pp. 1-8.

Liao, P. et al., "A Fast Algorithm for Multilevel Thresholding," Journal of Information Science and Engineering, Dec. 30, 1999, pp. 713-727, vol. 17.

Varon, D.J. et al., "High-frequency monitoring of anomalous methane point sources with multispectral Sentinel-2 satellite observations," Atmospheric Measurement Techniques, Apr. 12, 2021, pp. 2771-2785, vol. 14.

Varon, D.J. et al., "Quantifying methane point sources from fine-scale satellite observations of atmospheric methane plumes," Atmospheric Measurement Techniques, Oct. 18, 2018, pp. 5673-5686, vol. 11.

* cited by examiner

AUTOMATED DETECTION AND QUANTIFICATION OF GAS EMISSIONS

CROSS REFERENCE TO RELATED APPLICATIONS

The present application is a Continuation-in-Part of International Application No. PCT/EP2021/069053, filed Jul. 8, 2021, published in English, which claims priority from U.S. Provisional Application No. 63/049,302, filed Jul. 8, 2020. The entire disclosures of which are incorporated herein by reference herein.

TECHNICAL FIELD

The present disclosure, in various embodiments, relates generally to a method for automatically detecting and/or quantifying gas emissions from satellite images. More particularly, the method relates to automatically detecting and/or quantifying gas emissions from satellite short-wavelength infrared images.

BACKGROUND

Methane gas emissions are increasingly subject to regulations worldwide. For example, oil and gas operations are required to install controls that keep methane gas from leaking out of oil and gas equipment by the US Environmental Protection Agency. Therefore, the detection of methane gas emissions is important for environmental and climate considerations and for health and security purposes. Information relating to method gas emissions may be useful to producers of methane gas and to regulatory agencies and governments worldwide.

BRIEF SUMMARY

Aspects of the present disclosure include a method comprising: obtaining an image of an area of interest from an imager installed on-board a satellite, detecting a variation of light intensity within the image, and correlating an amount of the variation in light intensity within the image to a gas concentration of a gas emission located in the area of interest depicted in the image.

Aspects of the present disclosure include a method comprising: determining an effective image of an area of interest, based on an imaging acquisition performed by an imager installed on-board an Earth observation satellite; estimating a reference image of the area of interest, wherein the reference image corresponds to the effective image in the absence of a gas emission located in the area of interest; normalizing the effective image with the reference image; determining a gas emission mask based on the normalized effective image; and correlating an amount of light intensity within the gas emission mask to a gas concentration of a gas emission located in the area of interest.

Aspects of the present disclosure also include a method comprising: determining a time-series of effective images of an area of interest, based on a time-series of imaging acquisitions performed by an imager installed on-board an Earth observation satellite; for each effective image of the time-series: estimating a reference image of the area of interest, wherein the reference image corresponds to the effective image in the absence of a gas emission located in the area of interest; normalizing the effective image with the reference image; determining a gas emission mask based on the normalized effective image; correlating an amount of light intensity within the gas emission mask to a gas concentration of a gas emission located in the area of interest; and monitoring methane pollution based on the gas concentration over the time-series of effective images.

Certain preferred but non-limiting features of the methods described above are the following, taken individually or in combination:
the effective image is a single band image;
the imager is a multispectral imager configured to capture a plurality of single band images of the area of interest and determining the effective image comprises calculating a ratio between a first and a second single band images captured by the multispectral imager;
the first single band image covers a first spectral band in which the gas emission at least partially absorbs light, and the second single band image covers a second spectral band in which the gas emission is absorbed to a lesser extent than in the first spectral band;
determining the effective image further comprises applying a logarithm to the calculated ratio;
the imager is a multispectral imager configured to capture a plurality of single band images of the area of interest and determining the effective image comprises calculating a linear combination of logarithms of each single band image captured by the imager;
coefficients of the logarithms of single band images more affected by the gas emission are positive and coefficients of the logarithms of the single band images less affected by the gas emission are negative;
the coefficients of the logarithms are computed by an optimization algorithm based on the correlation of bands and on the gas absorption spectra so as to maximize a signal-to-noise ratio of the effective image;
estimating the reference image of the area of interest comprises performing image reconstruction based on the effective image;
estimating the reference image of the area of interest comprises applying a non-local means denoising algorithm to the effective image;
estimating the reference image of the area of interest comprises a tensor decomposition of a tensor composed of images of a time-series of images of the area of interest;
estimating the reference image of the area of interest comprises projecting the effective image on a time-series of images of the area of interest;
projecting the effective image on a time-series results in an intermediate reference image having pixels each associated to a projection residual and the method further comprises discarding pixels of the intermediate reference image based on their projection residuals, removing pixels of the effective image and of the time-series of images in correspondence with the discarded pixels; projecting the effective image with removed pixels on the time-series of images with removed pixels to determine weights of a linear combination of the images of the time-series and calculating the reference image based on the determined weights;
said projecting is performed for each region of similar albedo in the effective image and the time-series of images;
determining the gas emission mask comprises thresholding the normalized effective image;
correlating the amount of light intensity within the gas emission mask comprises determining an optical path length of the gas emission by fitting a dimming function of the imager to the gas emission mask.

The method further comprises calculating a concentration of the gas emission from the determined optical path length; the imager is a shortwave infrared imager; the gas emission is a methane gas emission; and/or the method is reiterated based on a further acquisition performed by the imager when revisiting the area of interest.

Figure 1A:
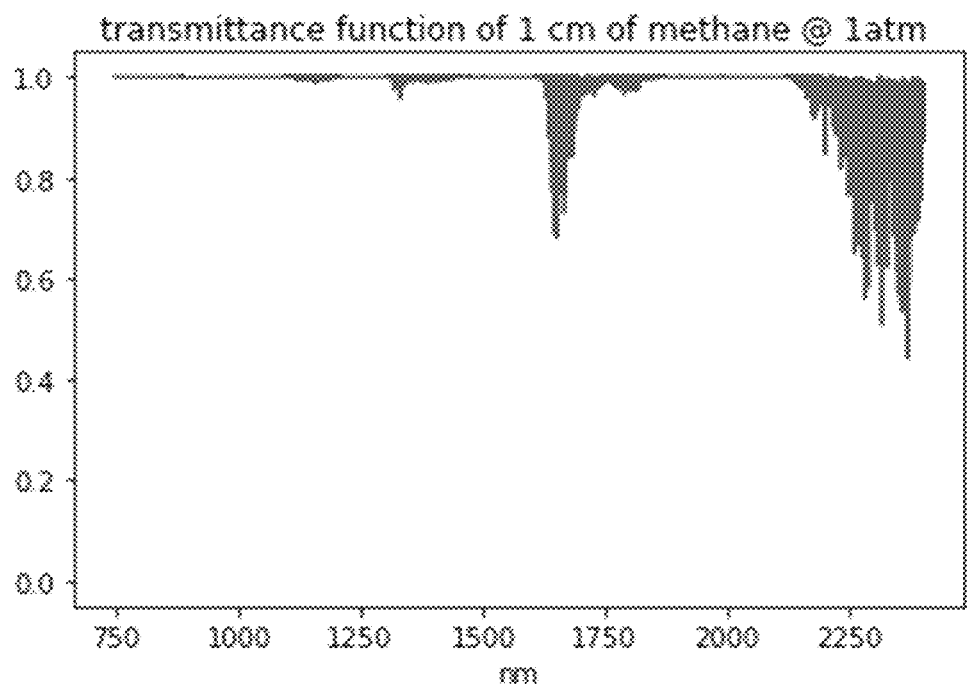
FIGS. 1A-1C are graphs plotting transmittance as a function of wavelength of a infrared light transmitted through methane gas at 1 atmosphere (atm) having an optical path length of 1 cm, 2 cm, and 3 cm, respectively.

The illustrations presented herein are merely idealized and/or schematic representations which are employed to describe embodiments of the present invention.

DETAILED DESCRIPTION

The goal of the method of the present disclosure is to provide automated detection and/or quantification of emissions of a predetermined gas by imaging obtained from an imager installed on-board an Earth observation satellite, such as short wavelength infrared (SWIR) imaging. The method is based on the gas absorption spectra and frequency response of the imager. Using this method, gas emissions (e.g., releases) may be detected and/or quantified globally and communicated to, by way of example and not limitation, gas emission producers and regulators.

The present disclosure provides an automated method for extracting gas emission concentration information from images of an area of interest. In some embodiments, the method comprises extracting methane gas emission concentration information from at least one infrared image, such as a short-wave infrared (SWIR) image. Gas emission concentration information may be extracted from images by correlating a variation in light intensity within the image to a gas concentration of a gas emission located in an area of interest depicted in the image. In the following, without that being limitative, example will be taken of a SWIR image.

The method may comprise calculating (e.g., determining) a gas emission concentration for at least one infrared spectral band in the SWIR image. The gas emission concentration may be quantified given that some percentage of infrared light is absorbed by (i.e., not transmitted through) the emitted gas. The gas emission concentration that may be quantified from the SWIR image further depends upon the extent of attenuation in the SWIR image. The extent of attenuation in the image may be computed by estimating a reference image of the area of interest, wherein the reference image corresponds to the SWIR image in the absence of a gas emission located in the area of interest.

While embodiments of the present disclosure may be described with reference to methane gas emissions, the method is not so limited. The method may be used to detect and/or quantify emissions of any gas emission that at least partially absorbs light.

The method may comprise obtaining at least one SWIR image depicting an area of interest from an imager installed on-board an Earth observation satellite. In some embodiments, the satellite may be a DigitalGlobe WorldView-3 satellite (hereinafter "the WV3 satellite"), a satellite equipped with the Moderate-Resolution Imaging Spectroradiometer MODIS, a satellite equipped with the Visible Infrared Imaging Radiometer Suite VIIRS, a Landsat 8 satellite, and/or a Sentinel-2 satellite.

The area of interest may comprise at least one gas emission plume for which a gas concentration may be determined according to the method set forth herein. Optionally, the method may comprise an initial step of identifying a gas plume using a machine learning algorithm. A deep learning algorithm may be trained to detect a shape of a gas plume within an image. For instance, the method may utilize a semantic segmentation task that identifies a gas plume shape. The deep learning algorithm may be trained using a classical U-NET architecture.

The method may employ any multispectral imager that captures a plurality of single band images of the area of interest. Such a multispectral imager detects at least two wavelengths of infrared light including an active wavelength for which the gas emission absorbs infrared light and a reference wavelength for which the gas emission either does not absorb infrared light or for which the gas emission absorbs infrared light to a lesser extent than the active wavelength. As used herein, the term "active band" refers to a first spectral band having the active wavelength such that light is absorbed by the gas emission in the active band. As used herein, the term "reference band" refers to a second spectral band different from the active band having the reference wavelength such that light is either fully transmitted through the gas emission in the reference band or such that infrared light is absorbed to a lesser extent than in the active band.

The intensity of light transmitted through a material is related to a concentration of the material through which the light travels and may be calculated using the Beer-Lambert law. Beer-Lambert's law is shown by the following formula, wherein A is absorbance, E is the molar attenuation coefficient or absorptivity of the material through which light is passed, and c is the concentration of the material through which light is passed:

$$A = \varepsilon l c$$

Absorbance (A) is inversely proportional to transmittance (T) according to the following formula:

$$A = -\log_{10} T$$

Transmittance refers to the fraction of light at a given wavelength that is transmitted when passing through the material. Transmittance is a function of wavelength and the optical path length l. As can be seen from FIGS. 1A-1C, transmittance is a strictly decreasing function of the optical path length.

In the present disclosure, methane gas is the material of interest through which the infrared light travels. Therefore, with respect to the Beer-Lambert law, the absorption coefficient of methane is used to calculate transmittance and/or absorbance from the obtained SWIR images in the examples herein.

Figure 1B:
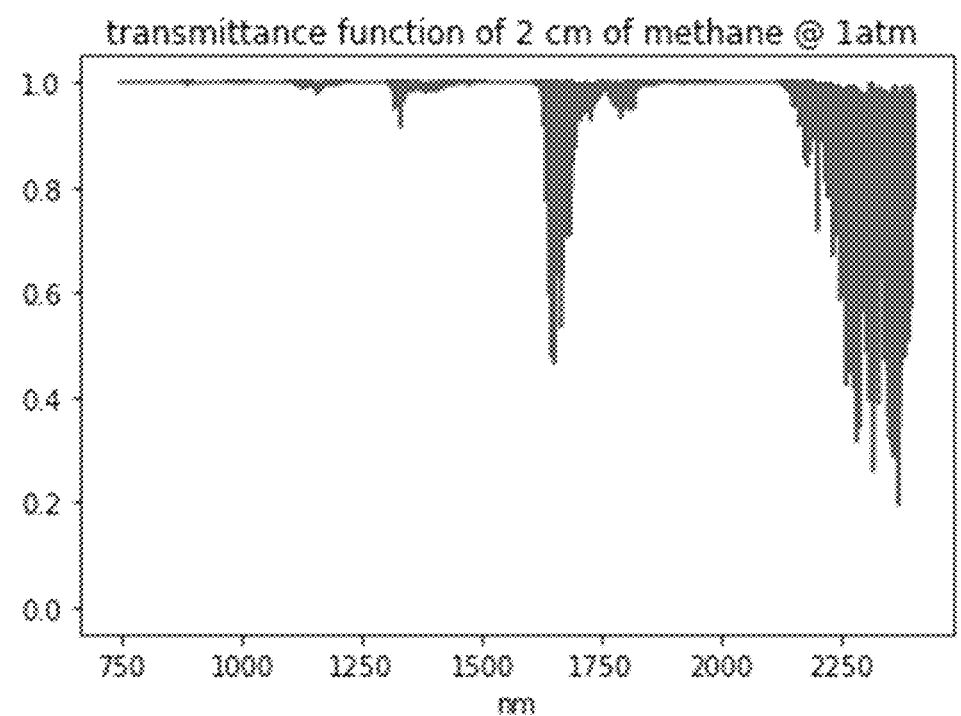
Figure 1C:
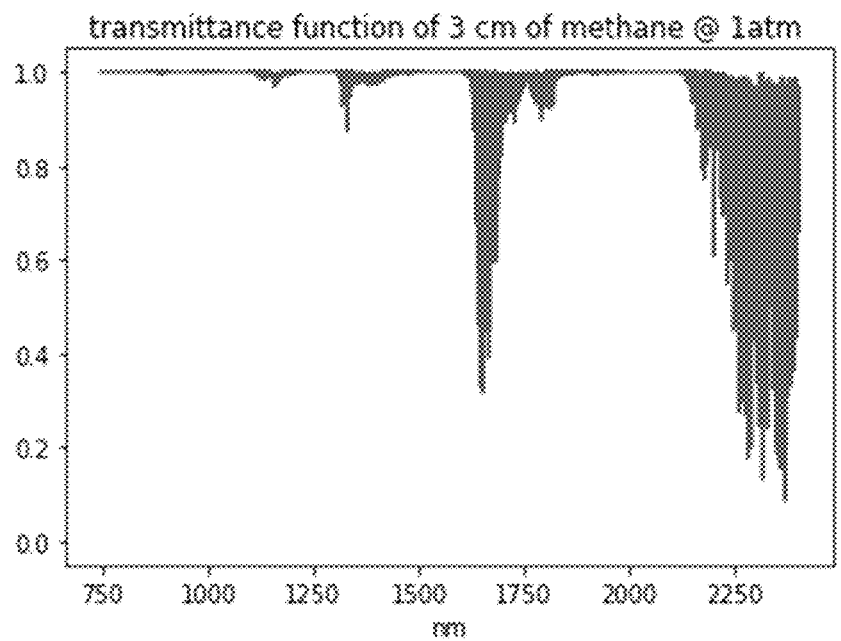

FIGS. 1A-1C illustrate the transmittance of infrared light through methane gas as a function of wavelength for optical path lengths of 1, 2, and 3 cm, respectively. Transmittance is plotted in a range extending from 0 to 1, wherein a transmittance value of 1 indicates that light is fully transmitted through the methane gas (e.g., no light is absorbed by the methane gas) and a transmittance value of 0 indicates that no light is transmitted through the methane gas (e.g., light is fully absorbed by the methane gas). As can be seen from FIGS. 1A-1C, transmittance decreases as the optical path length increases.

The method may further comprise obtaining at least one relative radiometric response curve for at least one infrared band captured by the infrared imager. In some embodiments, the method may comprise obtaining a plurality of relative radiometric response curves for at least one active band and for at least one reference band. For example, the method may comprise obtaining a first relative radiometric response curve for the active band and a second relative radiometric response curve for the reference band of the infrared sensor.

By way of example, the infrared imager of the WV3 satellite captures eight SWIR bands (SWIR1-SWIR8) as outlined in the table below. As previously stated, while the method is described with reference to the SWIR sensor of the WV3, the method is not so limited. Rather, the method of the present disclosure may employ other infrared imagers that capture fewer than or more than eight SWIR bands. By way of further example, the Sentinel-2 satellite includes an imager capturing two SWIR bands having a central wavelength of about 1600 nm (band B11: 1568-1659 nm) and about 2200 nm (band B12: 2114-2289 nm), respectively.

| Spectral range | Band name | Spectral band | GSD (Ground Sample Distance) |
|---|---|---|---|
| Multiband (8 bands) in SWIR (Shortwave Infrared) spectral range | SWIR-1 | 1195-1225 nm | Nadir: 3.70 m |
| | SWIR-2 | 1550-1590 nm | 20° off-nadir: |
| | SWIR-3 | 1640-1680 nm | 4.10 m |
| | SWIR-4 | 1710-1750 nm | |
| | SWIR-5 | 2145-2185 nm | |
| | SWIR-6 | 2185-2225 nm | |
| | SWIR-7 | 2235-2285 nm | |
| | SWIR-8 | 2295-2365 nm | |

Figure 2:
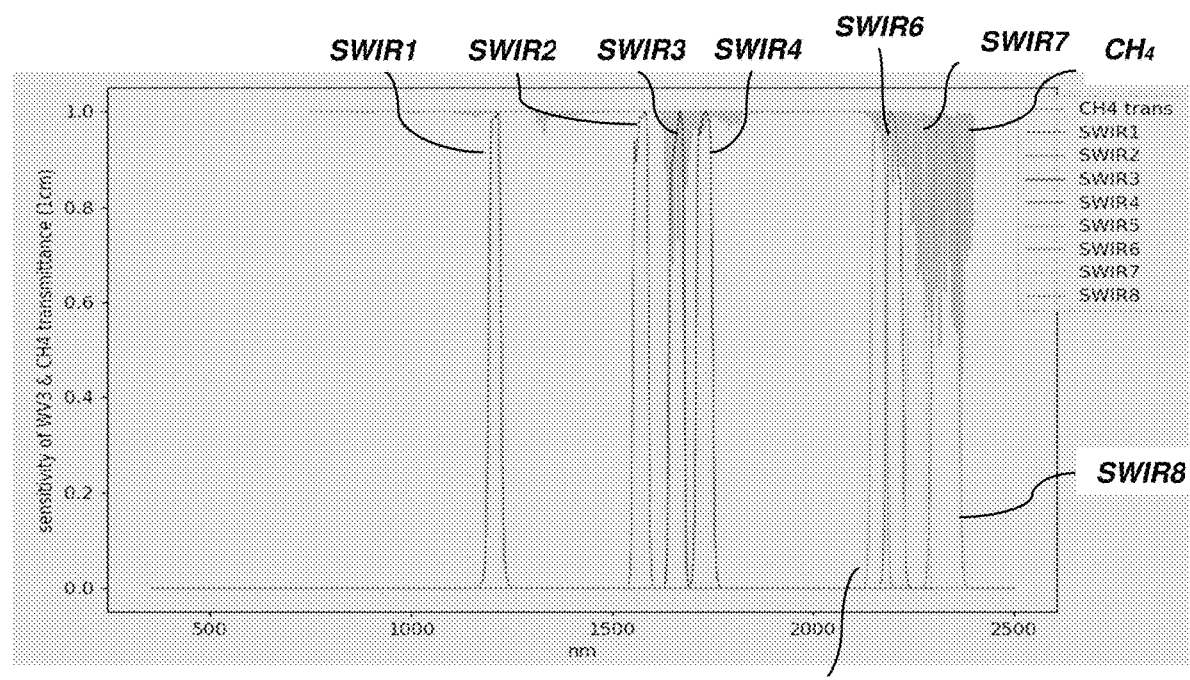
FIG. 2 is a frequency response curve for an infrared sensor plotting sensitivity of the infrared sensor to eight short wave infrared bands and methane transmittance as a function of wavelength.

The relative radiometric response curve for each of the eight SWIR-bands (SWIR1-SWIR8) captured by the WV3 satellite sensor is illustrated in FIG. 2. FIG. 2 is a graph plotting sensitivity of the sensor together with transmittance of methane (when the optical path length is 1 cm) as a function of the wavelength of infrared light. Assuming limited interference from other atmospheric gases, the attenuation of infrared light detected in the sensor's SWIR bands corresponding to methane absorption can be attributed to methane only.

The method may further comprise calculating (e.g., determining) an amount of light collected by at least one SWIR band of the sensor in a fully transparent environment. More particularly, the method may comprise calculating an amount of infrared light collected by the at least one active band in a fully transparent environment and an amount of light collected by the at least one reference band in the fully transparent environment.

For a given SWIR band (e.g., the active band or reference band), the calculated value for a given SWIR band is referred to herein as a "reference sensor frequency response". For a given SWIR band of the sensor, the integral of the response curve is a measure of the amount of light that is collected by the sensor within the given SWIR band in a fully transparent environment (e.g., wherein no light is absorbed).

The method may further comprise calculating (e.g., determining) an effective sensor frequency response for at least one SWIR band captured by the sensor in an environment containing the emitted gas. More particularly, the method may comprise calculating the amount of infrared light collected by the at least one active band in the emitted gas and an amount of light collected by the at least one reference band in the emitted gas.

As used herein, the "effective sensor frequency response" refers to an amount of infrared light collected by the at least one SWIR band (e.g., the active band or reference band) of the sensor in an environment containing the emitted gas. The effective sensor frequency response is obtained by combining the frequency response curve of the at least one SWIR band with the transmittance of the emitted gas (here, methane gas), as illustrated in FIG. 2. In other words, the effective sensor frequency response of a given SWIR band may be calculated as the product of the emitted gas transmittance function and sensor frequency response over the given SWIR band. For a given SWIR band, the area under the frequency response curve and under the emitted gas transmittance function is a measure of the amount of infrared light that is collected by the imager in the presence of methane.

The method may further comprise calculating (e.g., determining) a dimming function for at least one SWIR band captured by the sensor. More particularly, the method may comprise calculating a dimming function for the active band and for the reference band of the infrared sensor.

The dimming function is a measure of a percentage of infrared light that is not absorbed by the emitted gas in an environment. The dimming function, $\alpha$, may be associated to a gas concentration for a given band B. Here, the initial infrared light of a given band, $B_0$, and the infrared light of the same given band as effected by the emitted gas, $B_t$. The presence of the emitted gas can be explained by the dimming according to the formula:

$$B_t = \alpha B_0$$

The dimming function is the ratio of the integral of the effective sensor frequency response to the integral of the reference sensor frequency response for a given SWIR band. As a ratio, the dimming function has a value in a range extending from 0 to 1, which values respectively correspond to full absorption of infrared light by the emitted gas and no absorption of infrared light by the emitted gas (e.g., full transmission through the emitted gas). Accordingly, by calculating the dimming function, the method comprises determining a percentage of infrared light that was absorbed by and that was not absorbed by (e.g., transmitted through) the emitted gas before reaching the imager.

Figure 3A:
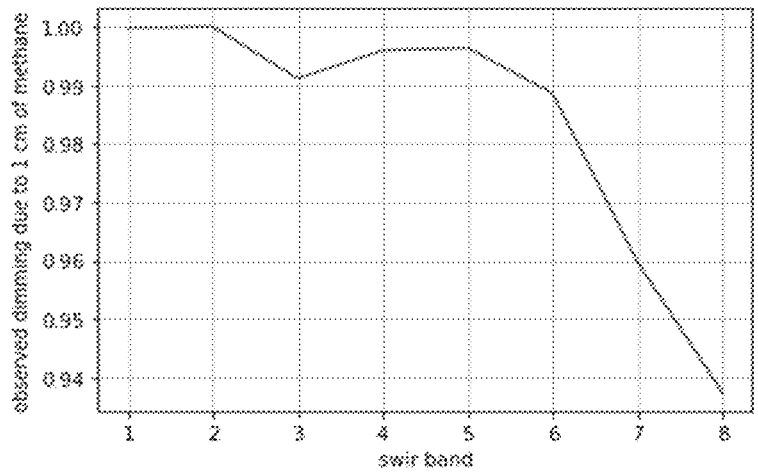
FIGS. 3A-3C are graphs plotting a dimming function calculated according to a method of the present disclosure as a function of various short-wave infrared spectral bands.
Figure 3B:
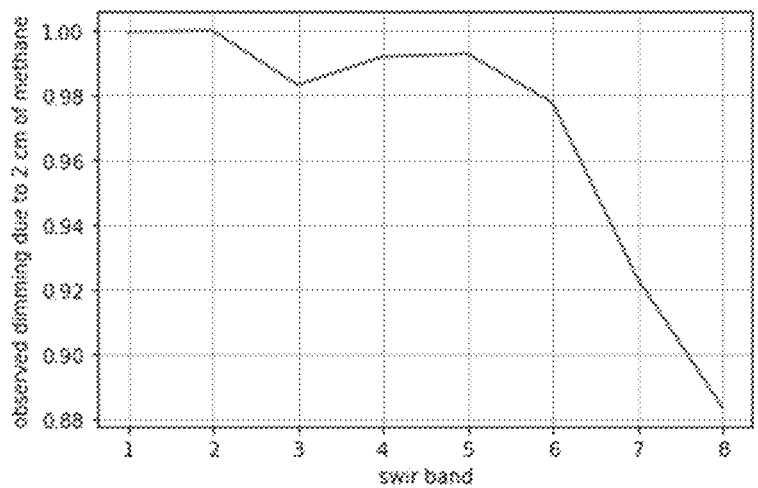
Figure 3C:
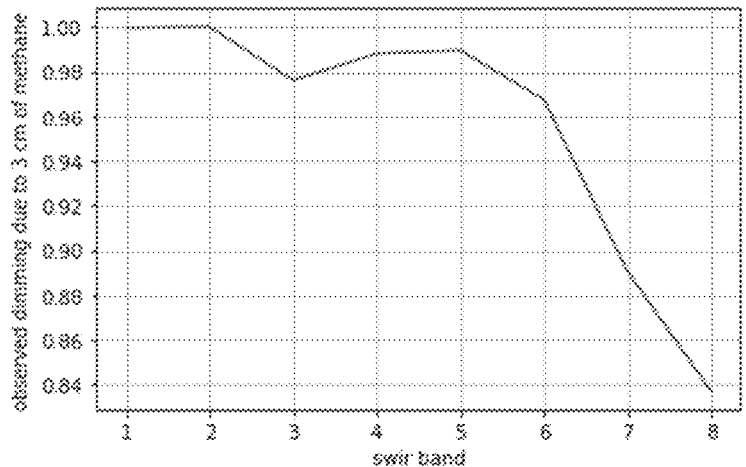

FIGS. 3A-3C are graphs plotting the dimming function as a function of the respective SWIR bands of the WV3 satellite sensor, wherein the optical path lengths are respectively 1 cm, 2 cm, and 3 cm.

In each of FIGS. 3A-3C, for the sensor bands SWIR1 and SWIR2, 100% of infrared light is transmitted through methane gas; therefore, the dimming function is 1. Infrared light starts to be absorbed by methane gas at SWIR3, as the dimming function is less than 1. The presence of methane is best detected in SWIR8. As shown in each of FIGS. 3A-3C, the lowest dimming function value is obtained in sensor band SWIR8, which indicates the greatest absorption of infrared light by methane gas in this band. As further shown in each of FIGS. 3A-3C, the greatest dimming function value having a value less than 1 is obtained in sensor band SWIR5. Accordingly, among SWIR bands that absorb infrared light, the least amount of infrared light is absorbed by methane gas in SWIR5. From a comparison of FIGS. 3A-3C, the dimming function can be seen to decrease as the optical path length increases.

Figure 4A:
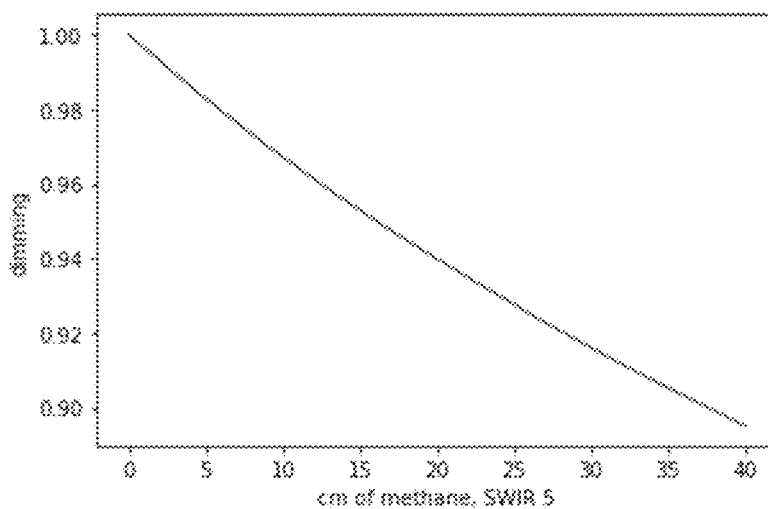
FIGS. 4A-4C are graphs plotting a dimming function calculated according to a method of the present disclosure as a function of optical path length through methane gas for various short-wave infrared spectral bands.
Figure 4B:
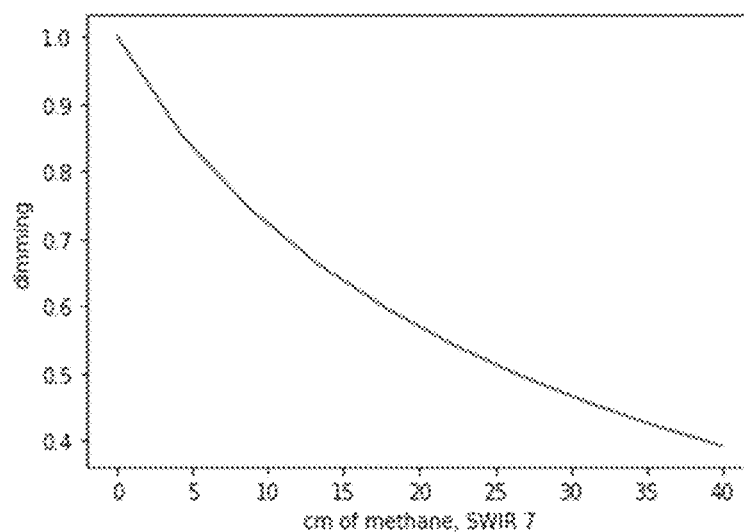
Figure 4C:
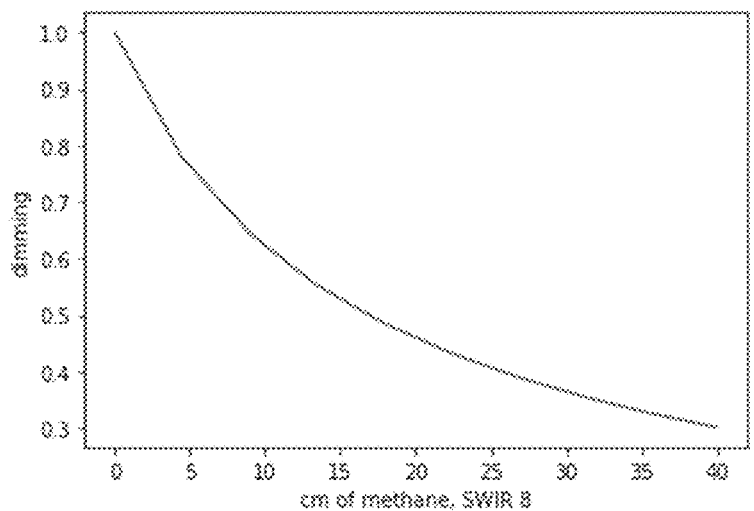

FIGS. 4A-4C illustrate the dimming function as a function of the optical path length through methane gas for SWIR bands 5, 7 and 8, respectively, of the WV3 satellite sensor. As can be seen from FIGS. 4A-4C, the dimming function value (indicated at SWIR8) is strictly decreasing (as expected from the Beer-Lambert law) with increasing optical path length. Accordingly, as the optical path length increases, the amount of infrared light absorbed by the methane gas increases. As illustrated from the FIGS. 4A-4C, the dimming function of SWIR8 has the largest sensitivity to the optical path length.

Finally, the dimming function maps the optical path length through methane gas and some infrared light that has been absorbed by some methane gas. Conversely, the bijectivity evidenced implies the existence of an inverse dimming function and a 1-1 correspondence between a percentage of infrared light absorbed at a pixel and an equivalent methane optical path length.

The calculated dimming function for at least one SWIR band of the sensor may be used in order to quantify some emitted gas concentration given some percentage of infrared light is absorbed by the emitted gas: depending on the extent of variation in infrared light intensity within the image (e.g., variation in infrared light intensity between pixels of the image), an optical path length of the emitted gas may be computed and, from the optical path length, a concentration of the emitted gas may be quantified.

Accordingly, the method of the present disclosure may further comprise processing of the obtained image to determine an amount of attenuation of infrared light therein. As previously stated, an amount of attenuation of infrared light may be correlated to a concentration of the emitted gas in the obtained image using the previously calculated dimming function.

Figure 5:
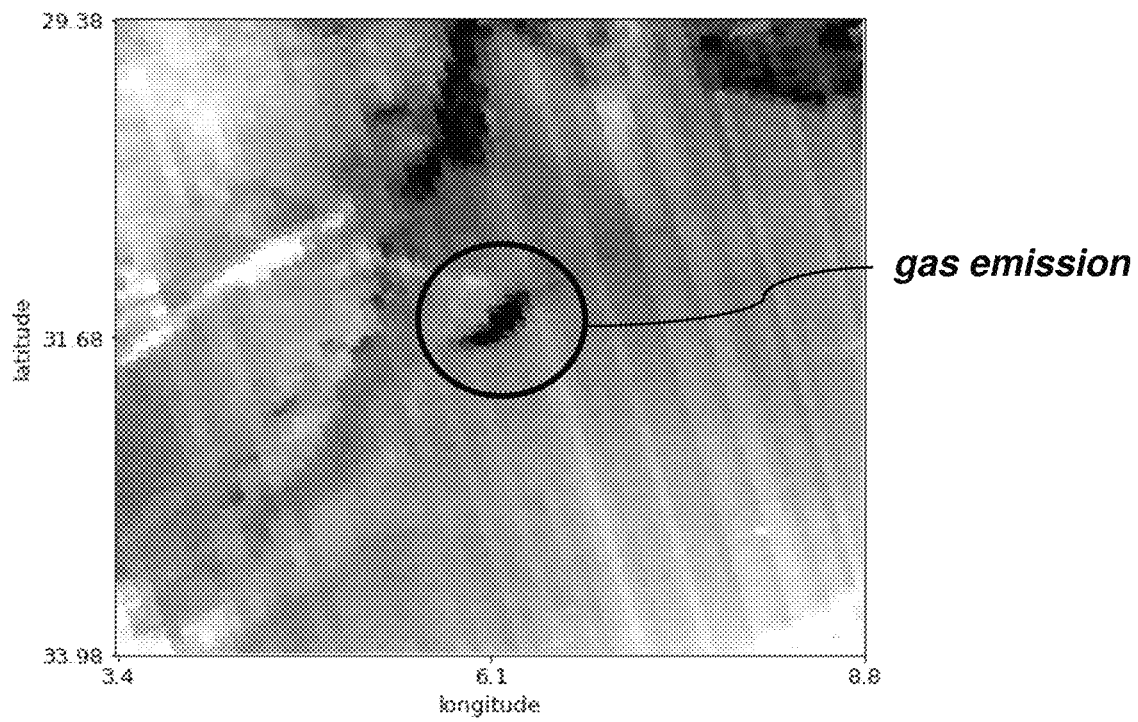
FIG. 5 is a schematic infrared image of an area of interest obtained from an overhead image acquisition device.

A schematic infrared image that may be obtained in the method of the present disclosure is provided as FIG. 5. FIG. 5 depicts an area of interest (AOI) including a site where the gas is expected to be emitted.

In order to determine an amount of infrared light absorption in each pixel of the image, the method may comprise determining an effective image of the area of interest, based on an imaging acquisition performed by an imager installed on-board an Earth observation satellite. The imager may be a single band imager or a multispectral imager.

The effective image may be a single band image, which may be one of a plurality of single images captured by a multispectral imager.

In another embodiment, the imager is a multispectral imager configured to capture a plurality of single band images of the area of interest and determining the effective image may comprise calculating a ratio between a first and a second single band images captured by the multispectral imager. The first single band image may cover a first spectral band in which the gas emission at least partially absorbs light (such as band B12 of Sentinel-2), and the second single band image may cover a second spectral band (such as band B11 of Sentinel-2), in which the gas emission is absorbed to a lesser extent than in the first spectral band. Determining the effective image may further comprises applying a logarithm to the calculated ratio.

In another embodiment, the imager is a multispectral imager configured to capture a plurality of single band images of the area of interest and determining the effective image may comprise calculating a linear combination of logarithms of each single band image captured of the infrared sensor. Coefficients of the logarithms of the SWIR bands that are more affected by the gas emission (e.g., the active band(s)) are positive, while coefficient of the logarithms of the SWIR bands that are less affected by the gas emission (e.g., the reference band(s)) are negative. The coefficients of the logarithms of the SWIR bands are computed by an optimization algorithm based on a correlations of the SWIR bands and on the gas absorption spectra so as to maximize the signal-to-noise ratio of the effective image.

The Beer-Lambert law states that for a light source with intensity $I_0$ and a wavelength $\lambda$, the dimming of light is:

$$I = I_0 e^{-\sum_{i=0}^{N} A_i(\lambda) l_i},$$

where I is the light intensity reduced as a function of the atmosphere (the light goes through N gases defined by their absorption $A_i(\lambda)$ and equivalent optical path length $l_i$ being the product of the nadir optical path and the concentration of the ith gas).

It can be reasonably assumed that $I_0$ is constant for the wavelengths considered. Taking into account that the imager of a satellite integrates over a band of wavelengths described by a sensitivity function s, the intensity of the light seen by a space-borne imager becomes $$I = I_0 \int s(\lambda) \alpha(\lambda) e^{-\eta \sum_{i=0}^{N} A_i(\lambda) l_i} d\lambda,$$

where the two passes through the atmosphere are taken into account in $\eta$ (which is a function of both the sun azimuth angle and the satellite view angle). The reflection coefficient of the ground is represented in the formula by the surface albedo $\alpha(\lambda)$.

In the presence of a methane emission, characterized by $l_{leak}$, the intensity of the light seen by the imager becomes $$I = I_0 \int s(\lambda) \alpha(\lambda) e^{-\eta \sum_{i=0}^{N} A_i(\lambda) l_i} e^{-\eta A_{CH4}(\lambda) l_{leak}} d\lambda.$$

A ratio of the signal with the gas emission and the signal without the gas emission, is:

$$\frac{\int s(\lambda)\alpha(\lambda)e^{-\eta\Sigma_{i=0}^{N}A_i(\lambda)l_i}e^{-\eta A_{CH4}(\lambda)l_{leak}}d\lambda}{\int s(\lambda)\alpha(\lambda)e^{-\eta\Sigma_{i=0}^{N}A_i(\lambda)l_i}d\lambda}$$

By way of example of the foregoing steps with reference to SWIR bands of the WV3 satellite, the images for bands SWIR8, which has the greatest absorption by methane gas, and SWIR5, which has relatively low absorption by methane gas, are selected. SWIR5 is further selected as the closest spectral band to SWIR8 with low absorption by methane. For both SWIR8 and SWIR5, the absorption behavior is expected to be the same in the background of the image including the reference area. With reference to SWIR bands of the Sentinel-2 satellite, band B12, which has the greatest absorption by methane gas, and band B11, which has relatively low absorption by methane gas, are selected. B11 is further selected as the closest spectral band to B12 with low absorption by methane.

Figure 6:
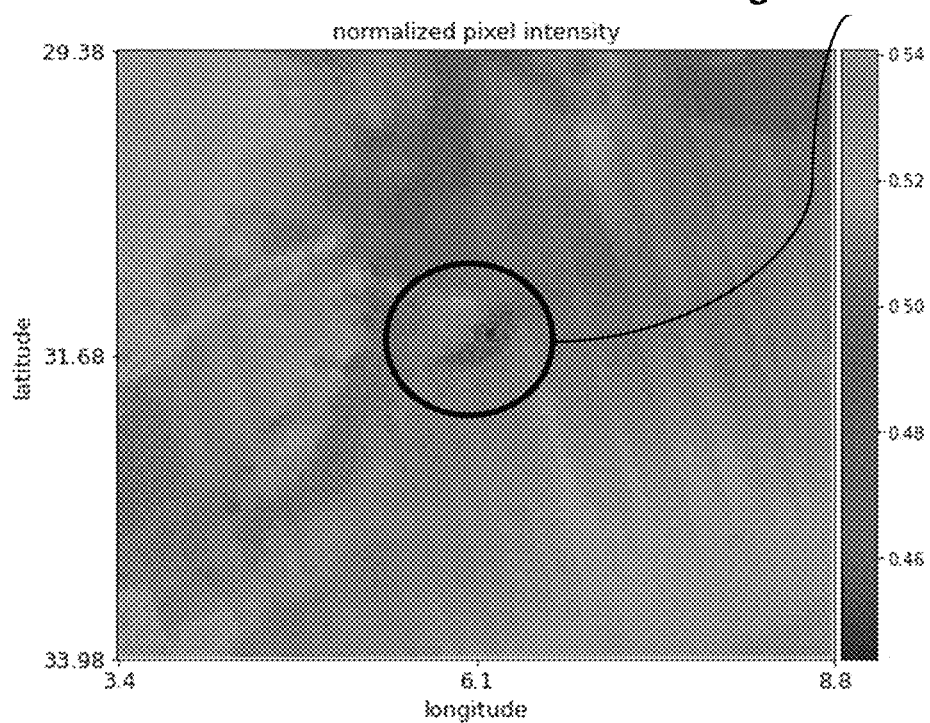
FIG. 6 illustrates the area of interest of FIG. 5 for which an active band/reference band image has been obtained.

The method may comprise determining a ratio of the infrared light intensity of at least one active band image to the infrared light intensity of at least one reference band image. By dividing at least one active band by at least one reference band, objects that absorb infrared light in the active band(s), including methane gas, are highlighted while the remaining elements in the obtained image are smoothed (e.g., muted). FIG. 6 illustrates the AOI of FIG. 5 for which an active band/reference band image has been obtained.

The method of the present disclosure may comprise normalizing the effective image with a reference image of the area of interest. As seen before, the effective image may be a single band image or a composite image derived from at least two single band images. In some embodiments, the method may comprise normalizing SWIR images for the active band and the reference band. In other embodiments in which there exists more than one active band and/or more than one reference band for a given sensor, the bands that are normalized may be a first band in which absorption by the emitted gas is the greatest and a second band selected may be a band in which there is no absorption or another band in which absorption by the emitted gas occurs but at the lowest level relative to other bands.

The method may further comprise estimating the reference image of the area of interest, where the reference image corresponds to the effective image in the absence of a gas emission located in the area of interest.

Estimating the reference image may comprise performing image reconstruction based on the effective image to simulate a background of the image of FIG. 6. In other words, the image reconstruction simulates an environment behind the detected gas emission shown in the effective image.

For instance, performing image reconstruction based on the effective image comprises applying a denoising algorithm to the effective image. By way of example, denoising may comprise applying a non-local means denoising algorithm to the obtained image in order to obtain the background of the image. The non-local means denoising algorithm may be the image denoising method as described in "A non-local algorithm for image denoising," by A. Buades, et al., published in 2005 IEEE Computer Society Conference on Computer Vision and Pattern Recognition, Volume 2, pages 60-65, the entire disclosure of which is incorporated herein by this reference.

The denoising algorithm is based on using the reference band for which the emitted gas does not absorb to determine regions of the image with similar intensity. These regions are then used to extrapolate to the area hidden by the absorbing emitted gas in the active band/reference band ratio image.

Other methods than the non-local means denoising algorithm may be used to obtain the reference image (e.g., estimate the background of the effective image).

For example, SWIR images of the AOI taken at other times (e.g., a time series of images) may be used to obtain the background of the gas emission. Alternatively or additionally, similar pixels can be combined within the same image or from different images obtained at different times. Further, the combinations can be obtained by averaging the N nearest neighbors (with or without weights) or by projecting the current pixel on the vector space spanned by the neighbors.

By way of brief description. For each pixel of the obtained image to be denoised, a surrounding region of pixels of fixed size is compared to all other regions of the same size within some delimited zone far from the region including the emitted gas. For each of these delimited zones, a distance with the region to be denoised together with a gaussian coefficient which exponent depends on that distance are computed. A value of the gaussian coefficient is relatively high if the region to be denoised is similar to the surrounding region of pixels, and the value of the gaussian coefficient is relatively low if the region to be denoised is dissimilar from the surrounding region of pixels. The surrounding region of pixels is finally replaced by the coefficients-weighted average of all regions. Gaussian coefficients are computed for spectral bands for which methane gas does not absorb the infrared light, then applied to spectral bands where absorption occurs (e.g., the active band). This has the effect of bringing back pixels out of the region in which the emitted gas is depicted. In other words, an appearance of the region behind the emitted gas may be simulated (e.g., estimated).

Yet a further method for obtaining the background of the obtained image uses images of the AOI taken at other times and may comprise performing a tensor decomposition of a tensor composed of images of a time-series of images of the area of interest. Performing the tensor decomposition may comprise performing a pixel-wise regularized linear regression. Given a time series of images split into a batch of T dates, for each date t, the method includes projecting the image on date t on the t−1 images. Put differently, the method comprises training a linear regression model with intercept on X and Y, where X is a matrix of size (n, t−1), where n is the number of pixels in the image and Y is a (n, 1) vector corresponding to the date t. The residual of the projection ŷ yields the gas emission mask for the date t. A theoretical threshold may be set on this residual to detect a given gas emission concentration so as to eliminate false gas emission concentrations.

In other words, estimating the reference image of the area of interest comprises projecting the effective image on a time-series of images of the area of interest. When assuming that methane emissions are anomalous events, it is to be expected that most observations in a time series should not contain excess methane. So, if we suppose that the surface albedo is rather stable in time, the time series can be used to estimate a methane free background model that can be compared with the current observation. Here, the background for a given date can be computed as its linear regression over the previous dates. If we denote by $I_t$ the effective image at time t, then the regression computes the optimal weights $w_i$ that solve $$\min_{\{w_i\}} \left\| I_t - \sum_{i=0}^{t-1} w_i I_i \right\|^2.$$

The reference image can then be calculated as a linear combination $\Sigma_{i=0}^{t-1} w_i I_i$ of the images of the time series that uses the determined weights $w_i$. Result of the regression further defines a projection residual that corresponds to the difference between the reference image $I_t$ and the prediction $\Sigma_{i=0}^{t-1} w_i I_i$.

Similarly to how flaring could impact the background estimation, new (or disappearing) large structure can also lead to errors in the quantification. To limit the impact of outliers, robust estimation methods such as Huber regression or the iteratively reweighted least square algorithm can be used. In a possible embodiment, the method may comprises estimating the reference image with a two-step estimation process. A first estimation is done using a linear projection as previously presented and results in an intermediate reference image having pixels each associated to a projection residual. Then, some pixels of the intermediate reference image are discarded based on their projection residuals, for instance 5% of pixels with worst estimation. The remaining pixels are then used to perform a second projection, this time without the outliers. Stated differently, the method comprises removing pixels of the effective image and of the time-series of images in correspondence with the discarded pixels and projecting the effective image with removed pixels on the time-series of images with removed pixels to determine weights of a linear combination of the images of the time-series. Then, the method comprises calculating the reference image, based on the determined weights.

Despite removing outliers, the two-stage approach cannot deal with time series containing large zones with changing albedo, such as crop fields. In a possible embodiment, estimating the reference image may follow a spatially adaptive processing by performing one projection for each region of similar albedo in the effective image and the time-series of images.

To this purpose, an albedo map can be computed by clustering the pixels of the effective image and of the images of the time-series with four different features: the temporal standard deviation and mean of the band absorbing median, the x and y position of the pixel in the images. The clustering can be done using a Gaussian mixture model, and the optimal number of clusters can be fixed with the post analysis of the Bayesian information criterion of the clustering. This methodology being more computationally intensive can be performed only on regions with a high albedo variance.

Figure 7:
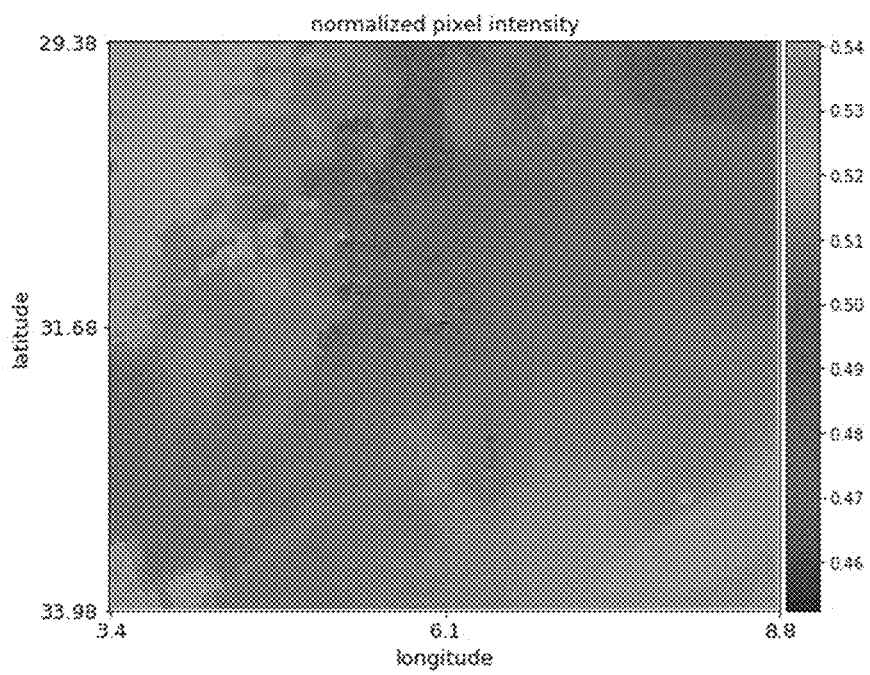
FIG. 7 illustrates the area of interest of FIG. 5 in which a background hidden by a gas emission is simulated in a denoising step.

The method may also optionally comprise applying a cloud cover detection algorithm to the time series of SWIR images of the AOI so as to remove images from any of the foregoing analyses that are comprised of, for example more than 15% of cloudy pixels (e.g., pixels in which gas emissions are undetectable due to cloud cover). The denoised image of the AOI that illustrates the simulated background obtained by the method is illustrated in FIG. 7. In FIG. 7, the emitted methane gas plume is no longer visible while any other background in the originally obtained image are substantially the same. Accordingly, the denoising step reveals the background behind the emitted gas.

An additional pre-processing steps may consist in performing an anti-aliasing filtering to the effective image. For instance, band B11 and band B12 of Sentinel-2 are aliased and when computing ratios of these two bands, this aliasing can create large artifacts during the later processing. The anti-aliasing filter may be a Gaussian filter. Another pre-processing may consist as already discussed above in applying a log on the ratio. This limits the impact on the reconstruction of abnormal high values present in the SWIR bands, for example due to flaring, which are frequently found in the vicinity of oil and gas facilities.

Figure 8:
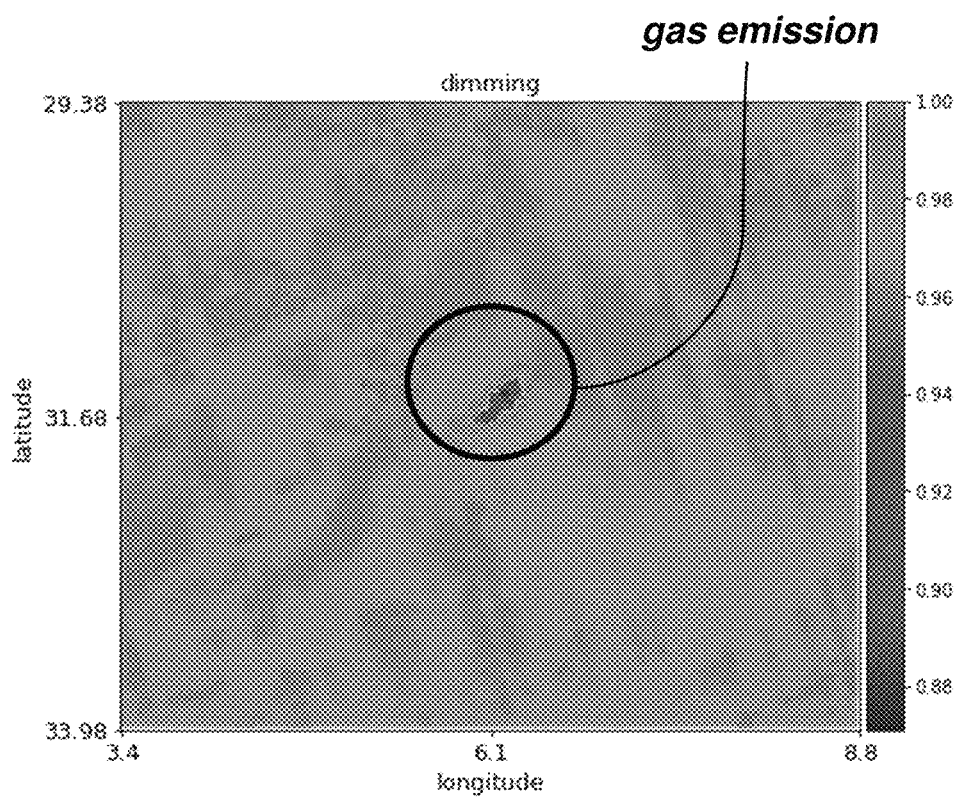
FIG. 8 illustrates the area of interest of FIG. 5 after the denoising step.

The simulated background image is then used to generate the normalized effective image of FIG. 8. After normalization with the simulated background, regions where the emitted gas plume is present are highlighted, and the remainder of the image has significantly reduced noise.

Figure 9:
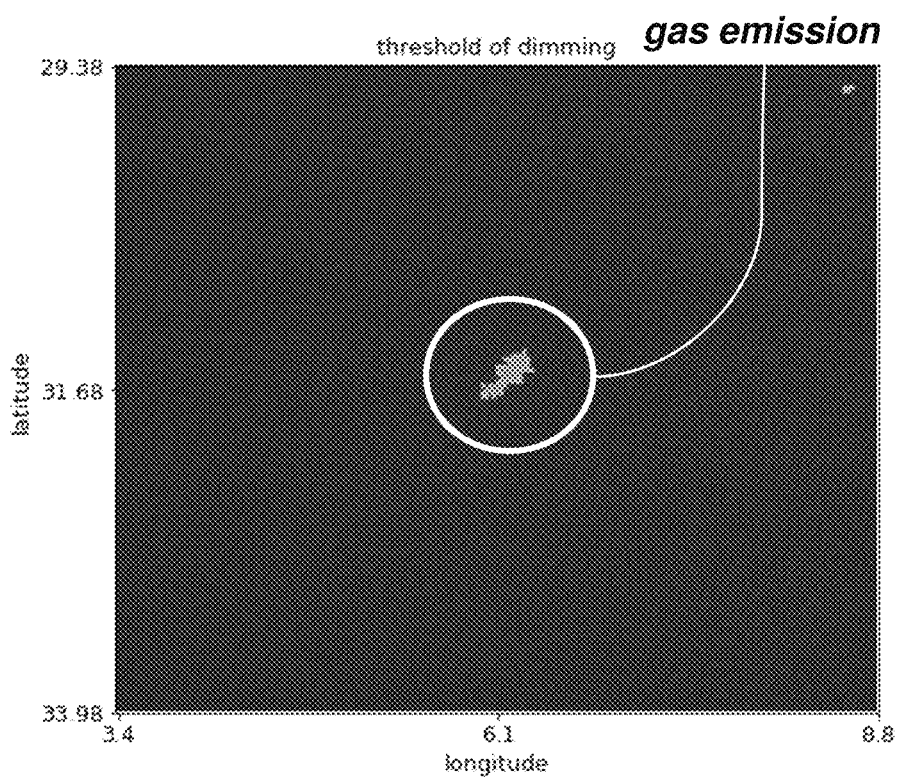
FIG. 9 illustrates the area of interest of FIG. 5 after an automatic thresholding step.

The method of the present disclosure may further comprise thresholding the normalized effective image, for instance by applying an automatic thresholding procedure to the normalized image of FIG. 8 to obtain FIG. 9. Applying the automatic thresholding procedure to the normalized image to isolate the gas emission relative to a remainder of the image not including the gas emission. The automatic thresholding procedure may be the Multi-Otsu thresholding method as described in "A fast algorithm for multilevel thresholding," by Liao, P-S., et al., published in Journal of Information Science and Engineering 17(5), pages 713-727 (2001). The entire disclosure of which is incorporated herein by this reference. Using this method, a histogram of pixel intensity is automatically split into three parts. The lower bound is taken as a threshold. Pixels with a normalized ratio below the threshold are considered in the method as being methane, leading to the generation of a methane mask. The methane mask refers to a depiction of the methane gas in the obtained image.

Any portion of the denoised image of FIG. 8 that is not considered to be the emitted gas is removed from the analysis and FIG. 9 is produced. FIG. 9 illustrates the gas emission mask. The areas removed from the analysis are the areas outside of the gas emission mask. The remaining image may be normalized against the reference active band/reference band ratio. The normalized active band/reference band ratio may have a value extending in a range from a value of 0 to a value of 1, where a value of 0 represents total absorption and a value of 1 represents total transmission. As some, but not all, of the infrared light is absorbed in the emitted gas, the normalized active band/reference band ratio generally falls in a narrower range between 0 and 1 such that the normalized active band/reference band ratio approaches a value of 0 but does not reach 0. Accordingly, in some embodiments, the active band/reference band ratio has a value that is greater than 0 and less than or equal to 1.

The method may further comprise calculating (e.g., determining) the normalized active band/reference band ratio for each pixel of the image. Each normalized active band/reference band ratio value is fit to the dimming function in a 1:1 relationship as previously discussed. Accordingly, from the normalized active band/reference band ratio, the concentration of the emitted gas in a given pixel can be determined using the dimming function.

Figure 10:
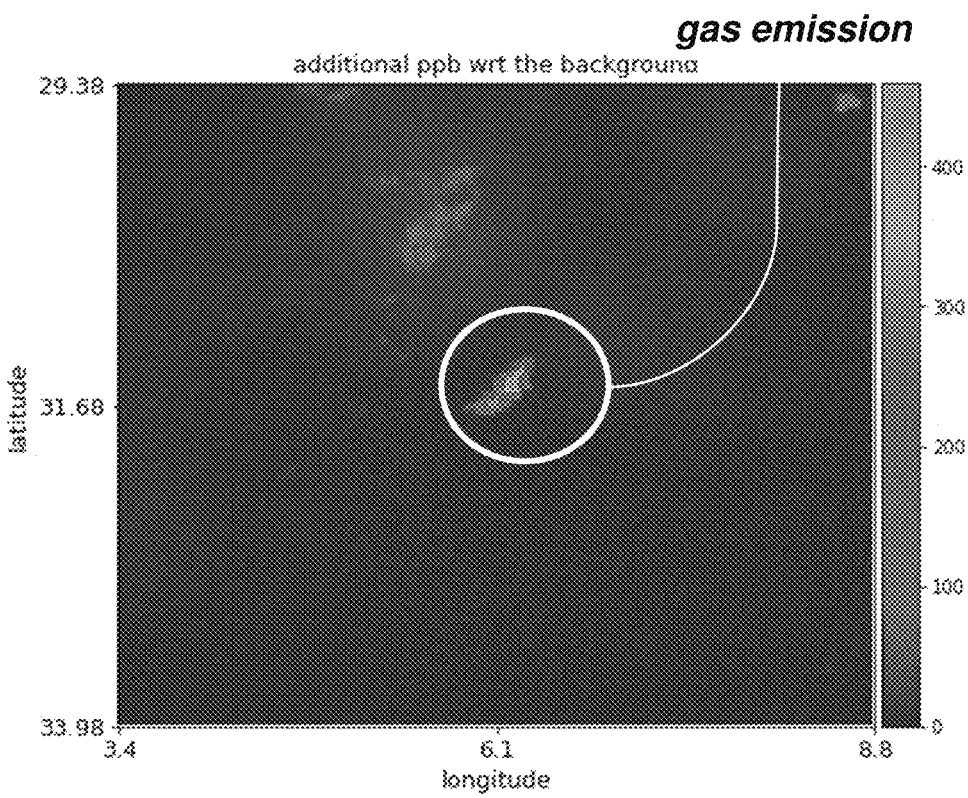
FIG. 10 illustrates the area of interest of FIG. 5 for which a concentration of the emitted gas in each pixel of the image has been determined.

FIG. 10 illustrates the concentration of the emitted gas in each pixel of the image of FIG. 5.

As previously described with reference to and illustrated in FIGS. 4A-4C, the dimming function is related to the optical path length through the emitted gas. Accordingly, from the normalized active band/reference band ratio, the optical path length through the emitted gas can be determined for each pixel pursuant to Beer-Lambert's law. Subsequently, the concentration of the emitted gas for each pixel of the image can be obtained from the calculated optical path length as explained below.

Having determined the gas emission mask, the method comprises correlating an amount of light intensity within the gas emission mask to a gas concentration of a gas emission located in the area of interest. Correlating the amount of light intensity within the gas emission mask may comprises determining an optical path length of the gas emission by fitting a dimming function of the imager to the gas emission mask.

The value of the optical path length $l_{leak}$ can be determined by solving the following optimization problem, here illustrated with band B12 of Sentinel-2:

$$\arg\min_{l_{leak}} \left\| R(p) - \left( \frac{\int_{B12} s(\lambda)\alpha(\lambda)e^{-\eta \sum_{i=0}^{N} A_i(\lambda)l_i} e^{-\eta A_{CH4}(\lambda)l_{leak}} d\lambda}{\int_{B12} s(\lambda)\alpha(\lambda)e^{-\eta \sum_{i=0}^{N} A_i(\lambda)l_i} d\lambda} \right) \right\|^2 ,$$

where R(p) denotes the estimated residual at pixel p and B12 denotes spectral band.

When taking into account the extra log preprocessing as well as the band ratio, this leads to an extra methane $\Delta\Omega(p)$ for the pixel p, here illustrated with the ratio of band B12 of Sentinel-2 to band B11 of Sentinel-2 and by assuming an atmosphere purely composed of methane (with an amount $l_{atm}$) and excess methane (with an amount $l_{leak}$).

$$\Delta\Omega(p) = \arg\min_{l_{leak}} \left\| R(p) - \log\left( \frac{\int_{B12} s(\lambda)\alpha(\lambda)e^{-\eta A_{CH4}(\lambda)(l_{leak}+l_{atm})} d\lambda}{\int_{B12} s(\lambda)\alpha(\lambda)e^{-\eta A_{CH4}(\lambda)l_{atm}} d\lambda} \frac{\int_{B11} s(\lambda)\alpha(\lambda)e^{-\eta A_{CH4}(\lambda)l_{atm}} d\lambda}{\int_{B11} s(\lambda)\alpha(\lambda)e^{-\eta A_{CH4}(\lambda)(l_{leak}+l_{atm})} d\lambda} \right) \right\|^2 .$$

With respect to the exemplary case discussed herein, if the infrared light detected by the sensor has traveled through a volume consisting of pure methane gas, the intensity of the infrared light will decrease by a factor equal to some normalized intensity measured at that pixel (e.g., the active band/reference band ratio having a value less than 1). The volume consisting of pure methane gas is determined from the cross-sectional area of the pixel and a height equal to that of the calculated optical path length through the methane gas. The total amount of molecules of gas contained in that volume of pure methane can then be derived from the ideal gas law. Accordingly, in the present method, a decrease in infrared light intensity should be determined for regions of the image within the methane mask.

If infrared light travels through a volume consisting of pure air (e.g., no methane gas is present or assuming that a volume of methane is negligible), the infrared light intensity will not be decreased (e.g., the normalized active band/reference band ratio having a value of 1). The volume consisting of pure air is determined from the cross-sectional area of the pixel and a height equal to the entire atmospheric column. The total amount of molecules of air contained in that volume of pure air can then be derived from the ideal gas law. Accordingly, in the present method, a decrease in infrared light intensity should not be calculated for regions of the image outside the gas emission mask. It shall be noted that under normal conditions, some gases (naturally present in minute quantities in the atmosphere but present in some cases as close to specific chemical industries) may have a spectral response similar to methane.

A final concentration (in ppb) of the emitted gas shown in the image may be calculated from the concentration of the emitted gas and concentration of pure air calculated for each pixel of a plurality of pixels of the image. The final concentration is computed as the ratio between the total number of molecules in the volume of pure emitted gas and the total number of air molecules contained the volume of pure air.

Another method for determining a concentration of the emitted gas shown in the image may be calculated using an integrated mass enhancement (IME) method. The IME method used according to embodiments of the present disclosure may be the IME method as described in D. J. Varon, et al., "Quantifying methane point sources from fine-scale satellite observations of atmospheric methane plumes," *Atmospheric Measurement Techniques*, vol. 11, no. 10, pp. 5673-5686, 2018, which is hereby incorporated in its entirety by this reference.

The IME method relates an emission rate Q to a total detected plume mass IME. The IME method uses plume enhancements $\Delta\Omega i[mol \times m2]$ observed over $i \in [1, N]$ plume pixels with area $A_i$ [m$^2$], an effective wind speed $U_{eff}$ [m×$s^{-1}$] and a plume length scale L [m] to estimate the emission rate Q:

$$Q = (U_{eff} L^{-1} \Sigma_i \Delta\Omega_i A_i$$

Here, N is obtained with a Boolean plume mask that distinguishes plume pixels from background pixels in the gas concentration image, and L is defined as the square root of a total plume area of the gas emission mask identified from the obtained image. According to methods of the present disclosure, plumes may be mixed over the entire Planetary Boundary Layer (PBL), such that $U_{eff}$ is taken to be equal to a local wind speed, which is representative of the average PBL wind.

To obtain the effective wind speed necessary for the IME method, the method of the present disclosure may further comprise a step of obtaining meteorological data for the area of interest in which the gas emission is detected. Such meteorological data may include wind velocity and/or wind direction for a given time period. The meteorological data may be obtained from one or more meteorological databases. The meteorological databases may obtain meteorological data from one or more remote sensing devices including overhead image acquisition devices. Such databases may include at least one of the National Oceanic and Atmospheric Administration (NOAA), European Centre for Medium-Range Weather Forecasts (ECMWF), the National Center for Environmental Prediction (NCEP), and Global Forecast System (GFS).

While the method has been described with reference to processing of a single image and quantification of the emitted gas in the image, the method is not so limited. The method may be applied to a plurality of images. In some embodiments, the method may be applied to a time series of images of the area of interest such that a variation in the quantity of and/or total quantity of the emitted gas may be determined over a period of time.

The method of the present disclosure may further comprise determining confidence intervals for the aforementioned calculation of the final concentration of methane present in the image to account for errors in the methodology, if any. For example, when the calculation of (active band/reference band)/(reference active band/reference band) results in values not equal to 1, the expected value outside of absorbing parts of the image (out of the methane mask computed above) leads to the determination of the standard deviation of the noise (sigma) considered as gaussian. Some range of dimming is obtained by fitting the dimming function into some desired range of ppb. Upper and lower endpoints of the confidence intervals may be obtained by performing the inverse dimming function to that dimming range increased and decreased by standard deviation of the noise, respectively.

A posteriori, pixels with (active band/reference band)/(reference active band/reference band) lower than sigma are not taken into account.

Figure 11:
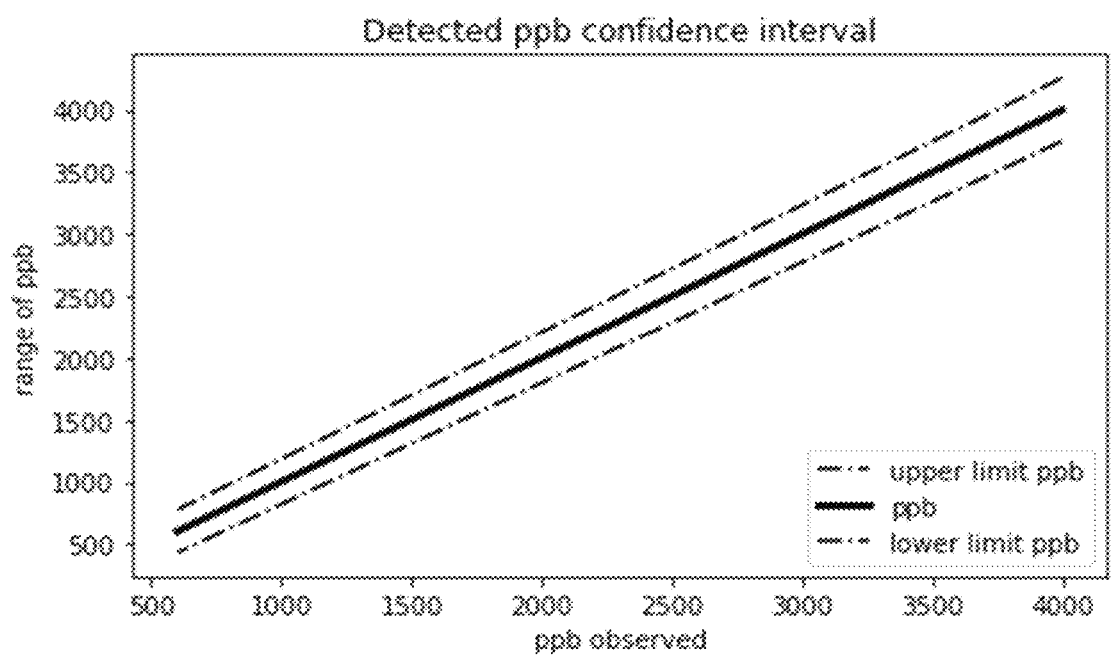
FIG. 11 illustrates confidence intervals for the determined gas emission concentration.

Typical confidence intervals are shown in FIG. 11. Confidence intervals may strongly vary depending on the overall quality of the image).

In the examples provided herein, small gas emission detections are obscured by the noise (about 250 ppb in the example case of detection of methane gas in the WV3 image).

Figure 12:
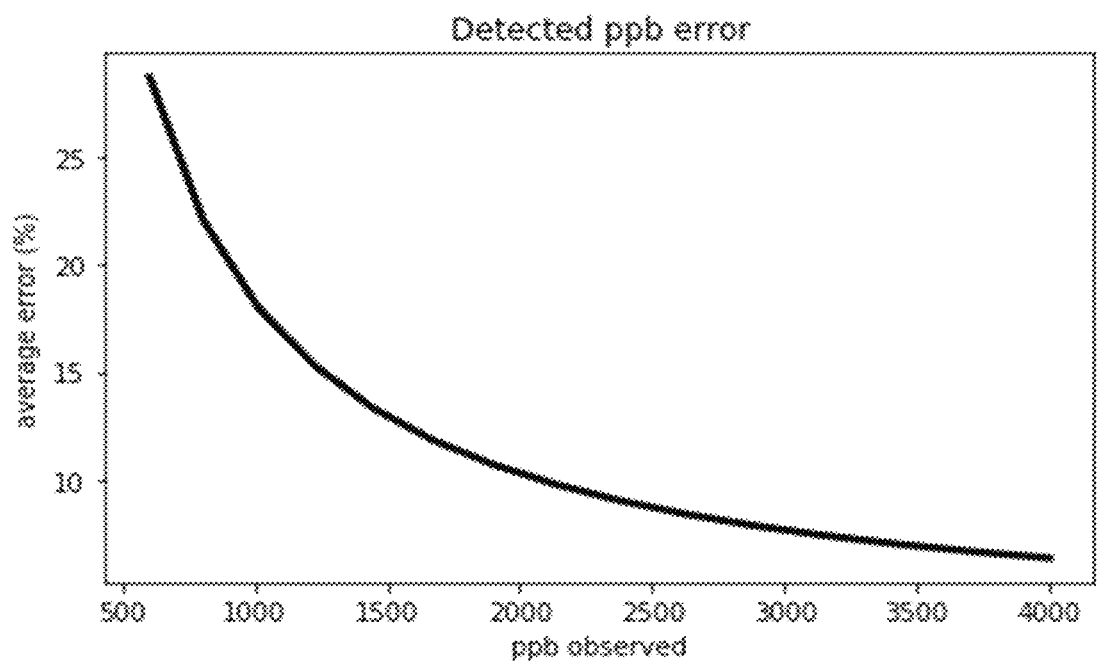
FIG. 12 illustrates an average error plot as a function of the determined gas emission concentration.

Average error (average between upper and lower confidence limits) as a function of the concentration is illustrated in FIG. 12.

The invention is not limited to the above-described methods but also relates to a data processing apparatus comprising a processor configured to implement any one of these methods as well as to a non-transitory computer medium having stored thereon code instructions that, when executed by a processor, cause the processor to implement any one of these methods.

Embodiments of the present disclosure may comprise or utilize a special purpose or general-purpose computer including computer hardware, such as, for example, one or more processors and system memory, as discussed in greater detail below. Embodiments within the scope of the present disclosure also include physical and other computer-readable media for carrying or storing computer-executable instructions and/or data structures. In particular, one or more of the processes described herein may be implemented at least in part as instructions embodied in a non-transitory computer-readable medium and executable by one or more computing devices (e.g., any of the media content access devices described herein). In general, a processor (e.g., a microprocessor) receives instructions, from a non-transitory computer-readable medium, (e.g., a memory, etc.), and executes those instructions, thereby performing one or more processes, including one or more of the processes described herein.

Computer-readable media can be any available media that can be accessed by a general purpose or special purpose computer system. Computer-readable media that store computer-executable instructions are non-transitory computer-readable storage media (devices). Computer-readable media that carry computer-executable instructions are transmission media. Thus, by way of example, and not limitation, embodiments of the disclosure can comprise at least two distinctly different kinds of computer-readable media: non-transitory computer-readable storage media (devices) and transmission media.

Non-transitory computer-readable storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

Further, upon reaching various computer system components, program code means in the form of computer-executable instructions or data structures can be transferred automatically from transmission media to non-transitory computer-readable storage media (devices) (or vice versa). For example, computer-executable instructions or data structures received over a network or data link can be buffered in RAM within a network interface module (e.g., a "MC"), and then eventually transferred to computer system RAM and/or to less volatile computer storage media (devices) at a computer system. Thus, it should be understood that non-transitory computer-readable storage media (devices) can be included in computer system components that also (or even primarily) utilize transmission media.

Computer-executable instructions comprise, for example, instructions and data which, when executed at a processor, cause a general purpose computer, special purpose computer, or special purpose processing device to perform a certain function or group of functions. In some embodiments, computer-executable instructions are executed on a general-purpose computer to turn the general-purpose computer into a special purpose computer implementing elements of the disclosure. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the disclosure may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like. The disclosure may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Embodiments of the present disclosure can also be implemented in cloud computing environments. In this description, "cloud computing" is defined as a model for enabling on-demand network access to a shared pool of configurable computing resources. For example, cloud computing can be employed in the marketplace to offer ubiquitous and convenient on-demand access to the shared pool of configurable computing resources. The shared pool of configurable computing resources can be rapidly provisioned via virtualization and released with low management effort or service provider interaction, and then scaled accordingly.

A cloud-computing model can be composed of various characteristics such as, for example, on-demand self-service, broad network access, resource pooling, rapid elasticity, measured service, and so forth. A cloud-computing model can also expose various service models, such as, for example, Software as a Service ("SaaS"), Platform as a Service ("PaaS"), and Infrastructure as a Service ("IaaS"). A cloud-computing model can also be deployed using different deployment models such as private cloud, community cloud, public cloud, hybrid cloud, and so forth. In this description and in the claims, a "cloud-computing environment" is an environment in which cloud computing is employed.

Figure 13:
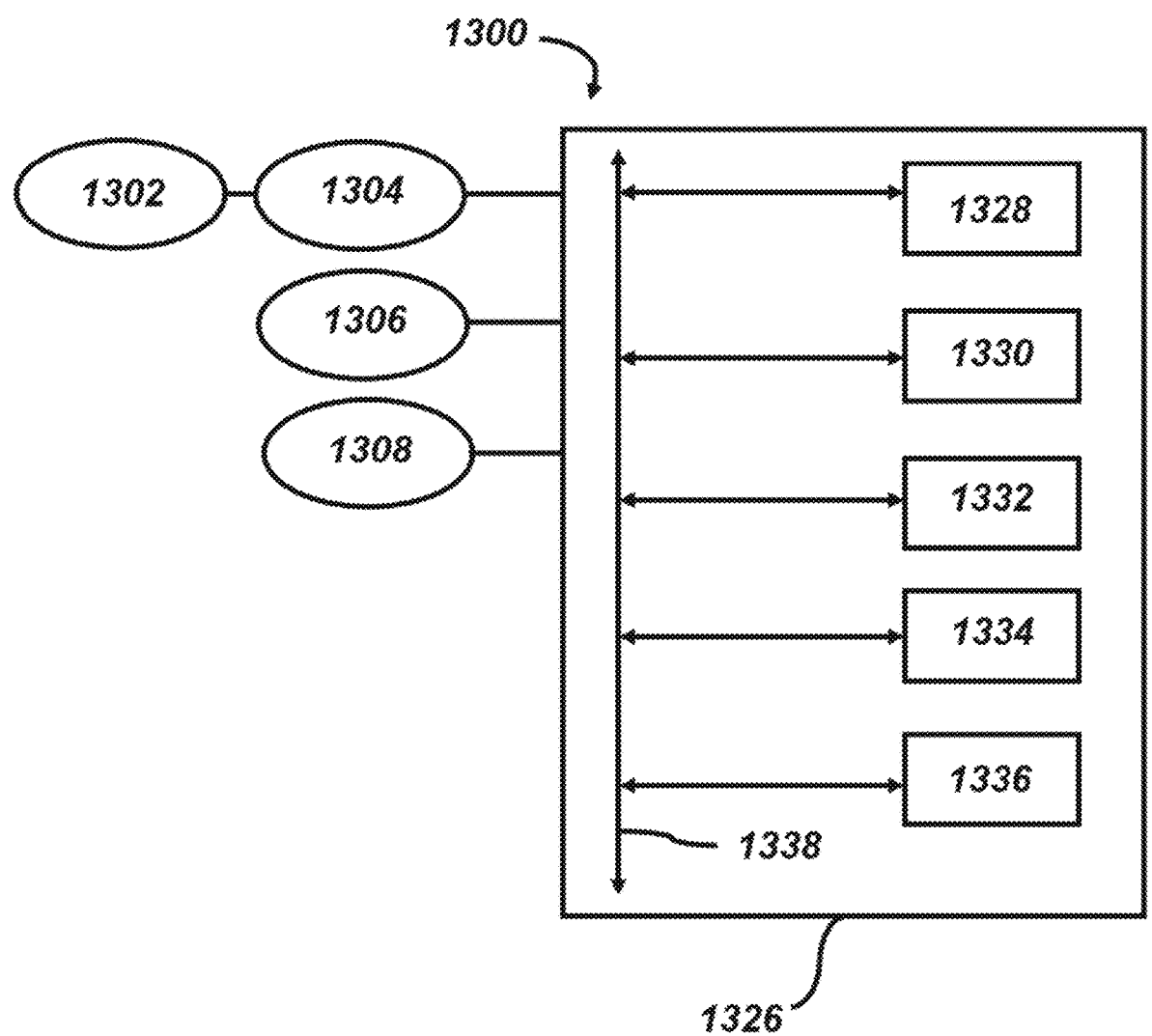
FIG. 13 is a schematic diagram of the general architecture of a system for performing the disclosed method.

FIG. 13 illustrates a block diagram of an example system 1300 that may be configured to perform one or more of the processes described above. The system 1300 is communicatively coupled to a plurality of databases. The plurality of databases may include at least one database 1304 from which SWIR images from an overhead image acquisition device 1302 are obtained, at least one database 1306 from which at least one relative radiometric response curved for the at least one infrared band captured by the infrared sensor of the overhead imaging device is obtained, and at least one database 1308 from which meteorological data is obtained. The plurality of databases may obtain images and other data from overhead image acquisition devices. In some embodiments, the overhead image acquisition devices may be different satellites comprising different sensors and image acquisitions devices.

The databases 1304, 1306, and 1308 may be stored on a non-transitory computer-readable storage media (device) as previously described herein. As shown by FIG. 13, the system 1300 may comprise a computing device 1326. The computing device 1326 may comprise a processor 1328, a memory 1330, a storage device 1332, an I/O interface 1334, and a communication interface 1336, which may be communicatively coupled by way of a communication infrastructure 1338. While an example computing device 1326 is shown in FIG. 13, the components illustrated in FIG. 13 are not intended to be limiting. Additional or alternative components may be used in other embodiments. Furthermore, in certain embodiments, the computing device 1326 can include fewer components than those shown in FIG. 13. Components of the computing device 1326 shown in FIG. 13 will now be described in additional detail.

In one or more embodiments, the processor 1328 includes hardware for executing instructions, such as those making up a computer program. By way of non-limiting example, to execute instructions, the processor 1328 may retrieve (or fetch) the instructions from an internal register, an internal cache, the memory 1330, or the storage device 1332 and decode and execute the instructions. In one or more embodiments, the computing device 1326 may include one or more internal caches for data, instructions, or addresses. By way of non-limiting example, the computing device 1326 may include one or more instruction caches, one or more data caches, and one or more translation look aside buffers (TLBs). Instructions in the instruction caches may be copies of instructions in the memory 1330 or the storage 1332.

The computing device 1326 includes memory 1330, which is coupled to the processor 1328. The memory 1330 may be used for storing data, metadata, and programs for execution by the processor(s) 1328. The memory 1330 may include one or more of volatile and non-volatile memories, such as Random Access Memory ("RAM"), Read Only Memory ("ROM"), a solid state disk ("SSD"), Flash, Phase Change Memory ("PCM"), or other types of data storage. The memory 1330 may be internal or distributed memory.

The computing device 1326 includes the storage device 1332 that includes storage for storing data or instructions. By way of non-limiting example, storage device 1332 can comprise a non-transitory storage medium described above. The storage device 1332 may include a hard disk drive (HDD), a floppy disk drive, flash memory, an optical disc, a magneto-optical disc, magnetic tape, or a Universal Serial Bus (USB) drive or a combination of two or more of these. The storage device 1332 may include removable or non-removable (or fixed) media, where appropriate. The storage device 1332 may be internal or external to the computing device 1326. In one or more embodiments, the storage device 1332 is non-volatile, solid-state memory. In other embodiments, the storage device 1332 includes read-only memory (ROM). Where appropriate, this ROM may be mask programmed ROM, programmable ROM (PROM), erasable PROM (EPROM), electrically erasable PROM (EEPROM), electrically alterable ROM (EAROM), or flash memory or a combination of two or more of these.

The computing device 1326 also includes one or more input or output ("I/O") devices/interfaces 1334, which are provided to allow a user to provide input to, receive output from, and otherwise transfer data to and receive data from computing device 1326. The I/O devices/interfaces 1334 may include a mouse, a keypad or a keyboard, a touch screen, a camera, an optical scanner, network interface, modem, other known I/O devices or a combination of such I/O device/interfaces. The touch screen may be activated with a stylus or a finger.

The I/O devices/interfaces 1334 may include one or more devices for presenting output to a user, including, but not limited to, a graphics engine, a display (e.g., a display screen), one or more output drivers (e.g., display drivers), one or more audio speakers, and one or more audio drivers. In certain embodiments, the I/O interface 1334 is configured to provide graphical data to a display for presentation to a user. The graphical data may be representative of one or more graphical user interfaces and/or any other graphical content as may serve a particular implementation.

The computing device 1326 can further include a communication interface 328. The communication interface 1336 can include hardware, software, or both. The communication interface 1336 can provide one or more interfaces for communication (such as, for example, packet-based communication) between the computing device 1326 and one or more other computing devices or networks. As an example and not by way of limitation, the communication interface 1336 may include a network interface controller (NIC) or network adapter for communicating with an Ethernet or other wire-based network or a wireless MC (WNIC) or wireless adapter for communicating with a wireless network, such as a WI-FI. The computing device 1326 can further include a bus. The bus can comprise hardware, software, or both that couples components of computing device 1326 to each other.

While the present disclosure has been described herein with respect to certain illustrated embodiments, those of ordinary skill in the art will recognize and appreciate that it is not so limited. Rather, many additions, deletions, and modifications to the illustrated embodiments may be made without departing from the scope of the invention as hereinafter claimed, including legal equivalents thereof. In addition, features from one embodiment may be combined with features of another embodiment while still being encompassed within the scope of the invention as contemplated by the inventors.

What is claimed is:

1. A method, comprising:
   determining an effective image of an area of interest, based on an imaging acquisition performed by an imager installed on-board an Earth observation satellite;
   estimating a reference image of the area of interest, wherein the reference image corresponds to the effective image in the absence of a gas emission located in the area of interest;
   normalizing the effective image with the reference image;
   determining a gas emission mask based on the normalized effective image; and
   correlating an amount of light intensity within the gas emission mask to a gas concentration of a gas emission located in the area of interest.

2. The method of claim 1, wherein the effective image is a single band image.

3. The method of claim 1, wherein the imager is a multispectral imager configured to capture a plurality of single band images of the area of interest and wherein determining the effective image comprises calculating a ratio between a first and a second single band images captured by the multispectral imager.

4. The method of claim 3, wherein the first single band image covers a first spectral band in which the gas emission at least partially absorbs light, and wherein the second single band image covers a second spectral band in which the gas emission is absorbed to a lesser extent than in the first spectral band.

5. The method of claim 3, wherein determining the effective image further comprises applying a logarithm to the calculated ratio.

6. The method of claim 1, wherein the imager is a multispectral imager configured to capture a plurality of single band images of the area of interest and wherein determining the effective image comprises calculating a linear combination of logarithms of each single band image captured by the imager.

7. The method of claim 6, wherein coefficients of the logarithms of single band images more affected by the gas emission are positive and coefficients of the logarithms of the single band images less affected by the gas emission are negative.

8. The method of any of claim 7, wherein the coefficients of the logarithms are computed by an optimization algorithm based on the correlation of bands and on the gas absorption spectra so as to maximize a signal-to-noise ratio of the effective image.

9. The method of claim 1, wherein estimating the reference image of the area of interest comprises performing image reconstruction based on the effective image.

10. The method of claim 9, wherein performing image reconstruction based on the effective image comprises applying a non-local means denoising algorithm to the effective image.

11. The method of claim 1, wherein estimating the reference image of the area of interest comprises a tensor decomposition of a tensor composed of images of a time-series of images of the area of interest.

12. The method of claim 11, wherein estimating the reference image of the area of interest comprises projecting the effective image on the time-series of images of the area of interest.

13. The method of claim 12, wherein projecting the effective image on the time-series of images of the area of interest results in an intermediate reference image having pixels each associated to a projection residual and further comprising:
   discarding pixels of the intermediate reference image based on their projection residuals;
   removing pixels of the effective image and of the time-series of images in correspondence with the discarded pixels;
   projecting the effective image with removed pixels on the time-series of images with removed pixels to determine weights of a linear combination of the images of the time-series;
   calculating the reference image, based on the determined weights.

14. The method of claim 12, wherein said projecting comprises performing one projection for each region of similar albedo in the effective image and the time-series of images.

15. The method of claim 1, wherein determining the gas emission mask comprises thresholding the normalized effective image.

16. The method of claim 1, wherein correlating an amount of light intensity within the gas emission mask to a gas concentration of a gas emission located in the area of interest comprises correlating the amount of light intensity in each pixel of the gas emission mask to a dimming function of the imager and determining an optical path length of the gas emission for each pixel.

17. The method of claim 16, further comprising calculating a concentration of the gas emission from the determined optical path length.

18. A method, comprising:
   determining a time-series of effective images of an area of interest, based on several imaging acquisitions performed by an imager installed on-board an Earth observation satellite;
   for each effective image of the time-series:
   estimating a reference image of the area of interest, wherein the reference image corresponds to the effective images in the absence of a gas emission located in the area of interest;
   normalizing the effective image with the reference image;
   determining a gas emission mask based on the normalized effective image; and
   correlating an amount of light intensity within the gas emission mask to a gas concentration of a gas emission located in the area of interest;
   monitoring methane pollution based on the gas concentration over the time-series of effective images.

19. A data processing apparatus, comprising a processor configured to implement:
   determining an effective image of an area of interest, based on an imaging acquisition performed by an imager installed on-board an Earth observation satellite;
   estimating a reference image of the area of interest, wherein the reference image corresponds to the effective image in the absence of a gas emission located in the area of interest;

normalizing the effective image with the reference image;
determining a gas emission mask based on the normalized effective image; and
correlating an amount of light intensity within the gas emission mask to a gas concentration of a gas emission located in the area of interest.

20. A non-transitory computer medium, comprising:
code instructions stored on the non-transitory computer medium, wherein when executed by a processor, the code instructions are configured to cause the processor to implement:
  determining an effective image of an area of interest, based on an imaging acquisition performed by an imager installed on-board an Earth observation satellite;
  estimating a reference image of the area of interest, wherein the reference image corresponds to the effective image in the absence of a gas emission located in the area of interest;
  normalizing the effective image with the reference image;
  determining a gas emission mask based on the normalized effective image; and
  correlating an amount of light intensity within the gas emission mask to a gas concentration of a gas emission located in the area of interest.

* * * * *